US006814883B2

(12) United States Patent
Marusawa

(10) Patent No.: US 6,814,883 B2
(45) Date of Patent: Nov. 9, 2004

(54) HIGH FREQUENCY MAGNETIC MATERIAL AND HIGH FREQUENCY CIRCUIT ELEMENT INCLUDING THE SAME

(75) Inventor: Hiroshi Marusawa, Moriyama (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 10/229,897

(22) Filed: Aug. 27, 2002

(65) Prior Publication Data

US 2003/0091841 A1 May 15, 2003

(30) Foreign Application Priority Data

Aug. 27, 2001 (JP) ....................................... 2001-256658
Aug. 7, 2002 (JP) ....................................... 2002-229566

(51) Int. Cl.[7] ........................... H01F 1/34; C01G 49/00; C04B 35/26

(52) U.S. Cl. ................................ 252/62.63; 252/62.64; 252/62.6; 252/62.62

(58) Field of Search ........................... 250/62.63, 62.64, 250/62.6, 62.62

(56) References Cited

U.S. PATENT DOCUMENTS

2003/0052299 A1 * 3/2003 Umeda et al. ............. 252/62.6

FOREIGN PATENT DOCUMENTS

| | | | |
|---|---|---|---|
| JP | 51-30389 | * | 3/1976 |
| JP | 6-349621 | | 12/1994 |
| JP | 07-326779 | | 6/1997 |
| JP | 9-205031 | | 8/1997 |
| JP | 08-082004 | | 9/1997 |
| WO | WO 02/070432 A1 | * | 9/2002 |

OTHER PUBLICATIONS

Copy of the People's Republic of China Office Action dated Dec. 5, 2003 (and English translation of same).

* cited by examiner

*Primary Examiner*—C. Melissa Koslow
(74) *Attorney, Agent, or Firm*—Dickstein, Shapiro, Morin & Oshinsky, LLP.

(57) ABSTRACT

A high frequency magnetic material includes a Y or M type hexagonal ferrite, wherein the hexagonal ferrite is expressed by the composition formula $(1\text{-}a\text{-}b)(Ba_{1-x}Sr_x)O.aMeO.bFe_2O_3$, where Me is at least one selected from the group consisting of Co, Ni, Cu, Mg, Mn and Zn, $0.205 \leqq a \leqq 0.25$, $0.55 \leqq b \leqq 0.595$, $0 \leqq x \leqq 1$, and $2.2 \leqq b/a < 3$. A high frequency circuit element includes magnetic layers and internal electrode layers, wherein the high frequency circuit element is a sintered compact and the magnetic layers include the high frequency magnetic material.

18 Claims, 1 Drawing Sheet

HIGH FREQUENCY MAGNETIC MATERIAL AND HIGH FREQUENCY CIRCUIT ELEMENT INCLUDING THE SAME

BACKGROUND OF THE INVENTION

1. Field of the Invention

The present invention relates to a high frequency magnetic material and a high frequency circuit element including the same.

2. Description of the Related Art

Among circuit components for mobile communication devices such as mobile phones and wireless LAN, an inductance element and an impedance element are known. The inductance element is used as a component for impedance-matching circuits, resonant circuits and choke coils. The impedance element is used as a component for devices for suppressing noise, which is called electromagnetic interference and is hereinafter referred to as EMI. Since devices using high frequency have been increasing, it is also necessary for circuit components used for these devices to operate at a frequency of several hundred MHz to several GHz.

A hexagonal ferrite has been proposed as a material for devices that can operate at a frequency of several hundred MHz to several GHz. This material maintains permeability in a frequency band exceeding the frequency at which a spinel ferrite cannot maintain permeability. The hexagonal ferrite referred to herein is a magnetic material called a ferrox planar type ferrite, which has an easy magnetization axis in a plane perpendicular to the c-axis and was reported in the beginning of 1957 by Phillips Corporation.

A typical magnetic material of the ferrox planar type ferrite includes a Co-substituted Z type hexagonal ferrite expressed by the composition formula $3BaO.2CoO.12Fe_2O_3$ ($Co_2Z$), a Co-substituted Y type hexagonal ferrite expressed by the composition formula $2BaO.2CoO.6Fe_2O_3(Co_2Y)$, and a Co-substituted W type hexagonal ferrite expressed by the composition formula $BaO.2CoO.8Fe_2O_3(Co_2W)$.

Among the above ferrox planar type ferrites, the Y type hexagonal ferrite has a large anisotropic magnetic field perpendicular to the c-axis and has a large threshold frequency in the relationship between the frequency and the permeability. The Co-substituted W type hexagonal ferrite expressed by the composition formula $BaO.2CoO.8Fe_2O_3$ ($Co_2W$), which is typical of a Y type hexagonal ferrite, has a certain permeability at a frequency of up to several GHz and is therefore expected to be usable as a magnetic material for devices operating at a frequency of several hundred MHz to several GHz.

However, the firing temperature must be 1,150° C., which is very high, in order that the ferrox planar type ferrite has a relative X-ray density of 90% or more. The relative X-ray density is herein defined as a ratio of the measured density of a sintered compact to the theoretical density, determined using X-rays.

Inductance elements and impedance elements are manufactured by firing green compacts including magnetic layers comprising a magnetic material and conductor layers comprising Ag or Ag—Pd, which has a small relative resistance. Therefore, the diffusion of Ag and the destruction of the inner conductor must not arise in sintered compacts during the firing. It is thus necessary to use a magnetic material providing sintered compacts having a relative X-ray density of about 90% or more when the green compacts are fired at 1,100° C. or less, and preferably at 1,000° C. or less. When the sintered compacts have a relative X-ray density of about 90% or more, practical inductance elements or impedance elements can be manufactured in terms of the mechanical strength of elements.

A ferrox planar type hexagonal ferrite is disclosed in Japanese Unexamined Patent Application Publication No. 9-167703. However, it is not indicated in the publication that the hexagonal ferrite expressed by the composition formula $(1\text{-a-b})(Ba_{1-x}Sr_x)O.aMeO.bFe_2O_3$ or $(1\text{-a-b})(Ba_{1-x}Sr_x)O.a(Me_{1-y}Cu_y)O.bFe_2O_3$, in which the ratio b/a is 2.2 or more to less than 3, can be sintered at low temperature. In the publication, substituting Ba with Pb is described but substituting Ba with Sr is not described. Effects obtained by firing the hexagonal ferrite in which Ba is substituted with Sr at low temperature are not also described.

Furthermore, a ferrox planar type hexagonal ferrite is also disclosed in Japanese Unexamined Patent Application Publication No. 9-246031. However, what is described in the publication is only how to sinter a Z type hexagonal ferrite at low temperature.

SUMMARY OF THE INVENTION

Accordingly, it is an object of the present invention to provide a high frequency magnetic material used for manufacturing an impedance element including an Ag or Ag—Pd inner conductor and having the excellent characteristic of suppressing EMI at a frequency of several hundred MHz to several GHz.

It is another object of the present invention to provide a high frequency magnetic material including a Y or M type hexagonal ferrite which absorbs noise and has high sintered density and permeability in which the imaginary part $\mu''$ is small at a frequency of less than 1 GHz and is large at a frequency of 1 GHz or more.

It is another object of the present invention to provide a high frequency magnetic material including a Y type hexagonal ferrite for impedance elements having high sintered density and the high $Q_m$ value (the ratio of the real part of the permeability to the imaginary part of the permeability) at a frequency of several GHz.

Furthermore, it is another object of the present invention to provide an inductance element and an impedance element operating at a frequency of several hundred MHz to several GHz using such a high frequency magnetic material.

In a first aspect of the present invention, a high frequency magnetic material includes a Y or M type hexagonal ferrite, wherein the hexagonal ferrite is expressed by the composition formula $(1\text{-a-b})(Ba_{1-x}Sr_x)O.aMeO.bFe_2O_3$, where Me is at least one selected from the group consisting of Co, Ni, Cu, Mg, Mn and Zn, $0.205 \leqq a \leqq 0.25$, $0.55 \leqq b \leqq 0.595$, $0 \leqq x \leqq 1$ and $2.2 \leqq b/a < 3$.

In a second aspect of the present invention, a high frequency magnetic material includes a Y or M type hexagonal ferrite, wherein the hexagonal ferrite is expressed by the composition formula $(1\text{-a-b})(Ba_{1-x}Sr_x)O.a(Co_{1-y}Cu_y)O.bFe_2O_3$, where $0.205 \leqq a \leqq 0.25$, $0.55 \leqq b \leqq 0.595$, $0 \leqq x \leqq 1$, $0.25 \leqq y \leqq 0.75$ and $2.2 \leqq b/a < 3$.

In a third aspect of the present invention, a high frequency magnetic material includes a Y or M type hexagonal ferrite, wherein the hexagonal ferrite is expressed by the composition formula $(1\text{-a-b})(Ba_{1-x}Sr_x)O.a(Co_{1-y-z}Cu_yMe_z)O.bFe_2O_3$, where Me is at least one selected from the group consisting of Ni, Mg and Zn, $0.205 \leqq a \leqq 0.25$, $0.55 \leqq b \leqq 0.595$, $0 \leqq x \leqq 1$, $0.25 \leqq y \leqq 0.75$, $0 < z \leqq 0.75$, $0.25 \leqq y+z \leqq 0.75$ and $2.2 \leqq b/a < 3$.

In a fourth aspect of the present invention, a high frequency magnetic material includes a Y or M type hexagonal ferrite, wherein the hexagonal ferrite is expressed by the composition formula (1-a-b)$(Ba_{1-x}Sr_x)$O.a$(Co_{1-y-z}Cu_yZn_z)$O.b$Fe_2O_3$, where $0.205 \leqq a \leqq 0.25$, $0.55 \leqq b \leqq 0.595$, $0 \leqq x \leqq 1$, $0.25 \leqq y \leqq 0.75$, $0<z \leqq 0.75$, $0.25 \leqq y+z \leqq 0.75$ and $2.2 \leqq b/a<3$.

The high frequency magnetic materials of the first to fourth aspects may further include about 0.1 to 30% by weight of $Bi_2O_3$.

In a fifth aspect of the present invention, a high frequency circuit element includes magnetic layers and internal electrode layers, wherein the high frequency circuit element is a sintered compact and the magnetic layers comprise the high frequency magnetic material according to any one of the first to fourth aspects.

A high frequency magnetic material of the present invention includes the hexagonal ferrite expressed by the composition formula (1-a-b)$(Ba_{1-x}Sr_x)$O.aMeO.b$Fe_2O_3$, in which the ratio b/a is 2.2 or more to less than 3. When a green compact includes the high frequency magnetic material, a sintered compact having a relative X-ray density of 90% or more can be obtained by firing the green compact at low temperature, for example, 1,100° C. or less. The sintered compact includes a Y or M type hexagonal ferrite as a main phase. In the above formula, Me is at least one selected from the group consisting of Co, Ni, Cu, Mg, Mn and Zn. Among these metal elements, Co is the most preferable. When Me includes two elements, the combination of Co and Cu is preferable. When Me includes three elements, the combination of Co, Cu and Zn are preferable. The above elements are bivalent metals and have similar ion radiuses. Thus, when Me includes such elements, the effects of low temperature sintering can be obtained. For the bivalent metals, Co has an ion radius of 0.72 Å, Ni has an ion radius of 0.69 Å, Cu has an ion radius of 0.72 Å, Mg has an ion radius of 0.66 Å, Mn has an ion radius of 0.80 Å, and Zn has an ion radius of 0.74 Å. For other elements, Ba has an ion radius of 1.34 Å, Sr has an ion radius of 1.13 Å, Fe has an ion radius of 0.74 Å, and O has an ion radius of 1.40 Å.

For a high frequency magnetic material according to the present invention, it is confirmed that a sintered body contains a Y type hexagonal ferrite as a main phase on the basis of the X-ray diffraction analysis of the sintered body and the calculation of formula 1 below using the analysis data. Formula 1 shows the ratio of the X-ray diffraction peak intensity of a Y type hexagonal ferrite (205) plane to the total amount of peak intensity of the heterogeneous magnetoplumbite hexagonal ferrite (BaM, SrM) (114) plane, the BF phase (212) plane, the spinel ferrite (220) plane, the CuO (111) plane, and the hexagonal ferrite (205) plane. The Y type hexagonal ferrite includes (Co, Cu)$_2$Y, the BF phase includes $BaFe_2O_4$, $BaSrFe_4O_3$ and the like, and the spinel ferrite includes $CoFe_2O_4$ and the like. In the present invention, a sintered body having a rate of 80% or more in formula 1 is defined as a Y type hexagonal ferrite. When the Sr-substituted rate is 100% (x=1), the main phase is a magnetoplumbite hexagonal ferrite and other phases are a spinel ferrite and $BaSrFe_4O_3$. The content of the magnetoplumbite hexagonal ferrite is determined using formula 1 in which the numerator is the peak intensity of the magnetoplumbite hexagonal ferrite (BaM, SrM) (114) plane. In the present invention, a sintered body having a rate of 60% or more in formula 1 having the above numerator is defined as an M type hexagonal ferrite.

The crystallization ratio of Y type hexagonal ferrite=peak intensity of (Co,Cu)$_2$Y(205) plane/peak intensity of {BaM(114) plane+BF(212) plane+spinel(220) plane+CuO(111) plane+(Co,Cu)$_2$Y(205) plane} Formula 1

In the second aspect of the present invention, Me in the composition formula (1-a-b)$(Ba_{1-x}Sr_x)$O.aMeO.b$Fe_2O_3$ includes Co and Cu in appropriate contents. Therefore, the magnetic material can readily be sintered at low temperature and a sintered compact obtained by firing a green compact at 1,000° C. or less has a relative X-ray density of 90% or more.

For a and b in the composition formula (1-a-b)$(Ba_{1-x}Sr_x)$O.aMeO.b$Fe_2O_3$, the ratio b/a is 2.2 or more to less than 3 and the formula is thus nonstoichiometric. When Me includes, for example, Co and Cu, low temperature sintering is allowed to proceed readily and the Y or M type hexagonal ferrite includes microcrystalline grains. Such a hexagonal ferrite has a large value of the product $\mu$Q at a frequency of several hundred MHz to several GHz. The hexagonal ferrite is suitable for inductance elements and impedance elements for suppressing EMI at a frequency of several GHz or more.

In the formula of third and fourth aspects of the present invention, the following conditions are satisfied: $0.205 \leqq a \leqq 0.25$, $0.55 \leqq b \leqq 0.595$, $0 \leqq x \leqq 1$, $0.25 \leqq y \leqq 0.75$, $0<z \leqq 0.75$, $0.25 \leqq y+z \leqq 0.75$ and $2.2 \leqq b/a <3$. Therefore, the formation of nonmagnetic spinel ferrites such as $BaFe_2O_4$ and $SrBaFe_4O_8$, which are crystal phases other than the Y or M type hexagonal ferrite, is suppressed. Thus, the real part $\mu'$ of the permeability of the hexagonal ferrite is at least 2 at a frequency of 1 GHz. In a magnetic material of the present invention, there is a possibility that a small amount of crystalline $BaFe_2O_4$ and $SrBaFe_4O_8$ is formed but the threshold frequency in the relationship between the permeability and the frequency is enhanced up to several GHz.

In the fifth aspect of the present invention, the magnetic material further contains $Bi_2O_3$ at a certain content. When using such a magnetic material, ferrox planar type hexagonal ferrite devices having the following characteristics can be obtained: a $Q_m$ value of 40 or more at a frequency of several GHz and a relative X-ray density of 95% or more.

As described above, a high frequency magnetic material of the present invention can be used for devices operating at a frequency of several hundred MHz to several GHz. When a laminate includes magnetic layers and Ag or Ag—Pd conductive layers each placed between the magnetic layers, such a laminate provides inductance elements and impedance elements operating at a frequency of several hundred MHz to several GHz.

DESCRIPTION OF THE PREFERRED EMBODIMENTS

Figure 1:
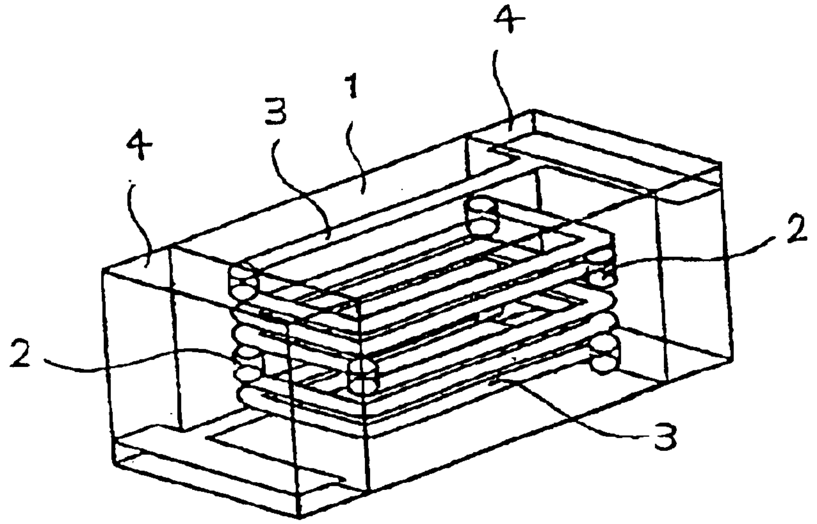
FIG. 1 is a perspective view showing a device functioning as a monolithic inductance element or impedance element according to the present invention.

The present invention will now be described with the examples below.

EXAMPLE 1

Barium carbonate ($BaCO_3$), strontium carbonate ($SrCO_3$), cobalt oxide ($Co_3O_4$) and iron oxide ($Fe_2O_3$) were provided as raw materials. The raw materials were weighed and mixed so as to form a magnetic material expressed by the composition formula (1-a-b)($Ba_{1-x}Sr_x$)O.aCoO.b$Fe_2O_3$, the values of a, b and x in the formula being shown in Table 1. Each mixture was further mixed with water using a ball mill, was dried, and was then fired at 900° C. to 1,150° C. in the ambient atmosphere.

TABLE 1

| | Composition Formula (1-a-b)($Ba_{1-x}SR_x$)O · b$Fe_2O_3$ | | | | Firing Temp. | Relative X-ray Density | Permeability | Product |
|---|---|---|---|---|---|---|---|---|
| samples | a | b | x | b/a | (° C.) | (%) | ($\mu$') | $\mu$Q |
| *1-1 | 0.190 | 0.610 | 0.90 | 3.2 | 1175 | 93 | 2.3 | 130 |
| *1-2 | 0.200 | 0.600 | 0.25 | 3 | 1150 | 91 | 2.4 | 135 |
| *1-3 | 0.200 | 0.540 | 0.50 | 2.7 | 1100 | 91 | 1.8 | 150 |
| *1-4 | 0.280 | 0.520 | 0.00 | 1.9 | 1075 | 91 | 1.8 | 190 |
| 1-5 | 0.205 | 0.595 | 0.00 | 2.9 | 1100 | 90 | 2.6 | 150 |
| 1-6 | 0.205 | 0.595 | 0.25 | 2.9 | 1080 | 90 | 2.3 | 155 |
| 1-7 | 0.205 | 0.595 | 0.90 | 2.9 | 1075 | 91 | 2.2 | 150 |
| 1-8 | 0.205 | 0.595 | 1.00 | 2.9 | 1070 | 90 | 2.8 | 100 |
| 1-9 | 0.220 | 0.560 | 0.50 | 2.55 | 1060 | 90 | 2.5 | 120 |
| 1-10 | 0.230 | 0.570 | 0.00 | 2.48 | 1100 | 93 | 2.3 | 150 |
| 1-11 | 0.230 | 0.570 | 0.25 | 2.48 | 1080 | 93 | 2.2 | 170 |
| 1-12 | 0.230 | 0.570 | 1.00 | 2.48 | 1070 | 93 | 2.2 | 160 |
| 1-13 | 0.250 | 0.550 | 0.00 | 2.2 | 1100 | 95 | 2.2 | 160 |
| 1-14 | 0.250 | 0.550 | 0.25 | 2.2 | 1080 | 95 | 2.1 | 155 |
| 1-15 | 0.250 | 0.550 | 0.90 | 2.2 | 1075 | 96 | 2.2 | 160 |
| 1-16 | 0.250 | 0.550 | 1.00 | 2.2 | 1070 | 95 | 2.2 | 150 |
| 1-17 | 0.250 | 0.595 | 0.25 | 2.38 | 1080 | 94 | 2 | 160 |
| 1-18 | 0.250 | 0.595 | 0.50 | 2.38 | 1070 | 93 | 2.1 | 150 |
| 1-19 | 0.250 | 0.595 | 1.00 | 2.38 | 1080 | 94 | 2 | 160 |
| *1-20 | 0.260 | 0.600 | 0.00 | 2.3 | 1100 | 91 | 1.5 | 190 |
| *1-21 | 0.280 | 0.520 | 0.25 | 1.9 | 1075 | 91 | 1.8 | 190 |

Each fired mixture was wet-ground with a ball mill to prepare a fired powder having a specific surface area of 5 $m^2$/g or more. Each fired powder was mixed with an acetic vinyl binder and was then dried to form a press molding powder. Each press molding powder was molded into a toroidal core. Each toroidal core was then fired in air at the temperature shown in Table 1.

Each fired toroidal core was used as a sample. The density of each sample was measured by the Archimedean method. The relative X-ray density of each sample was calculated on the basis of the measured density and the theoretical density determined by the X-ray method. The permeability (the real part $\mu'$) at a frequency of 1 GHz was measured with an impedance analyzer HP 4291A made by Hewlett-Packard Company. The product $\mu$Q was calculated from the real part $\mu'$ of the permeability obtained with the above impedance analyzer and the imaginary part $\mu''$ of the permeability as follows:

$$\mu Q=\mu' \times \mu' / \mu''$$

The results are shown in Table 1. In Table 1, sample numbers marked with an asterisk are comparative examples and outside the scope of the present invention. Samples 1-5 to 1-19 in Table 1 are examples of the present invention and are expressed by the composition formula (1-a-b)($Ba_{1-x}Sr_x$)O.aCoO.b$Fe_2O_3$, the following conditions being satisfied: 0.205≦a≦0.25, 0.55≦b≦0.595, 0≦x≦1 and 2.2≦b/a<3. Therefore, sintered bodies formed at 1,100° C. or less can be obtained. Furthermore, the sintered bodies have a relative X-ray density of 90% or more, a permeability of 2 or more, and a value of the product $\mu$Q of 100 or more. As the ratio b/a decreases, the permeability decreases due to the formation of crystalline $BaFe_2O_4$ and $SrBaFe_4O_8$.

In contrast, the following conditions are not satisfied in Samples 1-1 to 1-4 and 1-20 to 1-21: 0.205≦a≦0.25, 0.55≦b≦0.595, 0≦x≦1 and 2.2≦b/a<3. In to obtain sintered bodies having a relative X-ray density of 90% or more and a permeability of 2 or more, the firing temperature must exceed 1,100° C. In Sample 1-21 fired at 1,100° C. or less, the relative X-ray density is 90% or more but the permeability is less than 2. The toroidal core of Sample 1-21 was evaluated as being the same as an air-core coil.

According to the present invention, the sintered bodies having high relative X-ray density and permeability can be obtained even if the firing temperature is 1,100° C. or less. Such sintered bodies can be used for inductance elements and impedance elements having internal Ag—Pd electrodes.

EXAMPLE 2

In samples of this example, Me in the composition formula (1-a-b)($Ba_{1-x}Sr_x$)O.aMeO.b$Fe_2O_3$ includes Co and Cu.

Barium carbonate ($BaCO_3$), strontium carbonate ($SrCO_3$), cobalt oxide ($Co_3O_4$), copper oxide (CuO) and iron oxide ($Fe_2O_3$) were provided as raw materials. The raw materials were weighed and mixed so as to form a magnetic material expressed by the composition formula (1-a-b)($Ba_{1-x}Sr_x$)O.a($Co_{1-y}Cu_y$)O.b$Fe_2O_3$, the values of a, b, and x in the formula being shown in Table 2. In Table 2, sample numbers marked with an asterisk are comparative examples and outside the scope of the present invention. Each mixture was further mixed with water using a ball mill, was dried, and was then fired at 900° C. to 1,150° C. in atmosphere.

TABLE 2

| | Composition Formula $(1\text{-a-b})(Ba_{1-x}SR_x)O \cdot bFe_2O_3$ | | | | | Firing Temp. | Relative X-ray Density | Permeability | Product |
|---|---|---|---|---|---|---|---|---|---|
| samples | a | b | x | y | b/a | (° C.) | (%) | ($\mu'$) | $\mu$Q |
| *2-1 | 0.205 | 0.540 | 0.50 | 0.50 | 2.7 | 1100 | 90 | 2.4 | 95 |
| *2-2 | 0.190 | 0.610 | 0.90 | 0.50 | 3.2 | 1075 | 91 | 2.5 | 100 |
| *2-3 | 0.200 | 0.600 | 0.25 | 0.50 | 3 | 1050 | 90 | 2.4 | 110 |
| *2-4 | 0.280 | 0.520 | 0.00 | 0.50 | 1.9 | 950 | 90 | 1.8 | 150 |
| *2-5 | 0.205 | 0.595 | 0.00 | 0.20 | 2.9 | 1050 | 90 | 2.6 | 110 |
| 2-6 | 0.205 | 0.595 | 0.10 | 0.50 | 2.9 | 980 | 90 | 2.7 | 120 |
| 2-7 | 0.205 | 0.595 | 0.25 | 0.50 | 2.9 | 980 | 90 | 2.8 | 105 |
| 2-8 | 0.205 | 0.595 | 0.25 | 0.75 | 2.9 | 950 | 91 | 2.9 | 120 |
| *2-9 | 0.205 | 0.595 | 0.25 | 0.80 | 2.9 | 940 | 91 | 2.8 | 80 |
| 2-10 | 0.205 | 0.595 | 0.90 | 0.50 | 2.9 | 975 | 91 | 2.3 | 110 |
| 2-11 | 0.205 | 0.595 | 1.00 | 0.50 | 2.9 | 975 | 91 | 2.9 | 121 |
| 2-12 | 0.220 | 0.560 | 0.50 | 0.50 | 2.55 | 975 | 91 | 2.5 | 100 |
| 2-13 | 0.230 | 0.570 | 0.00 | 0.50 | 2.48 | 980 | 93 | 2.5 | 110 |
| 2-14 | 0.230 | 0.570 | 0.25 | 0.50 | 2.48 | 980 | 93 | 2.6 | 100 |
| 2-15 | 0.230 | 0.570 | 1.00 | 0.50 | 2.48 | 975 | 93 | 2.7 | 110 |
| *2-16 | 0.250 | 0.550 | 0.00 | 0.20 | 2.2 | 1050 | 90 | 2.5 | 110 |
| 2-17 | 0.250 | 0.550 | 0.00 | 0.50 | 2.2 | 980 | 92 | 2.6 | 100 |
| 2-18 | 0.250 | 0.550 | 0.00 | 0.75 | 2.2 | 980 | 92 | 2.7 | 110 |
| *2-19 | 0.250 | 0.550 | 0.00 | 0.80 | 2.2 | 975 | 92 | 2.5 | 75 |
| 2-20 | 0.250 | 0.550 | 1.00 | 0.50 | 2.2 | 900 | 95 | 2.5 | 190 |
| 2-21 | 0.250 | 0.550 | 0.25 | 0.50 | 2.2 | 900 | 95 | 2.4 | 190 |
| 2-22 | 0.250 | 0.550 | 0.25 | 0.75 | 2.2 | 875 | 96 | 2.0 | 180 |
| *2-23 | 0.250 | 0.550 | 1.00 | 0.80 | 2.2 | 970 | 94 | 2.0 | 75 |
| 2-24 | 0.250 | 0.595 | 0.25 | 0.50 | 2.38 | 980 | 94 | 2.1 | 120 |
| 2-25 | 0.250 | 0.595 | 0.50 | 0.50 | 2.38 | 970 | 93 | 2.0 | 110 |
| 2-26 | 0.250 | 0.595 | 1.00 | 0.50 | 2.38 | 980 | 94 | 2.0 | 120 |
| *2-27 | 0.260 | 0.600 | 0.00 | 0.50 | 2.3 | 1000 | 93 | 1.8 | 180 |
| *2-28 | 0.280 | 0.520 | 0.25 | 0.50 | 1.9 | 900 | 92 | 1.6 | 190 |

Each fired mixture was wet-ground with a ball mill to prepare a fired powder having a specific surface area of 5 $m^2/g$ or more.

Each fired powder was treated in the same way as in Example 1 and was molded into a toroidal core. Each toroidal core was then fired in air at the temperature shown in Table 2.

Each fired toroidal core was used as a sample. For each sample, the relative X-ray density, the permeability (the real part $\mu'$) at a frequency of 1 GHz, and the product $\mu$Q were obtained in the same way as in Example 1. The results are shown in Table 2.

As shown in Table 2, Samples 2-6 to 2-8, 2-10 to 2-15, 2-17 to 2-18, 2–22, and 2-24 to 2-26 are examples of the present invention and are expressed by the composition formula $(1\text{-a-b})(Ba_{1-x}Sr_x)O.a(Co_{1-y}Cu_y)O.bFe_2O_3$ in which the following conditions are satisfied: $0.205 \leqq a \leqq 0.25$, $0.55 \leqq b \leqq 0.595$, $0 \leqq x \leqq 1$, $0.25 \leqq y \leqq 0.75$ and $2.2 \leqq b/a < 3$. Therefore, sintered bodies formed at 1,000° C. or less can be obtained. Furthermore, the sintered bodies have a relative X-ray density of 90% or more, a permeability of 2 or more and a value of the product $\mu$Q of 100 or more. As the ratio b/a decreases, the permeability decreases due to the same reason as in Example 1.

In contrast, the following conditions are not satisfied in Samples 2-1 to 2-5, 2-9, 2-16, 2-19, 2-23, and 2-27 to 2-28: $0.205 \leqq a \leqq 0.25$, $0.55 \leqq b \leqq 0.595$, $0 \leqq x \leqq 1$, $0.25 \leqq y \leqq 0.75$ and $2.2 \leqq b/a < 3$. There is a problem in that sintered bodies cannot be obtained when the firing temperature is less than 1,000° C. and sintered bodies formed at 1,000° C. or less have a permeability of less than 2.

According to the present invention, the sintered bodies having high relative X-ray density and permeability can be obtained even if when the firing temperature is 1,000° C. or less. Such sintered bodies can be used for inductance elements and impedance elements having internal Ag—Pd electrodes.

In this example, Me is Co in the composition formula $(1\text{-a-b})(Ba_{1-x}Sr_x)O.a(Me_{1-y}Cu_y)O.bFe_2O_3$. However, in a Y or M type hexagonal ferrite, bivalent metal elements such as Ni, Mg, Mn, and Zn can occupy the site of Me. Thus, if Me includes Ni, Mg, Mn and Zn other than Co, the same effects as that of this example can be obtained.

EXAMPLE 3

Barium carbonate ($BaCO_3$), strontium carbonate ($SrCO_3$), cobalt oxide ($Co_3O_4$), iron oxide ($Fe_2O_3$), copper oxide (CuO) and zinc oxide (ZnO) were provided as raw materials. The raw materials were weighed and mixed so as to form a magnetic material expressed by the composition formula $$(1\text{-}a\text{-}b)(Ba_{1-x}Sr_x)O.a(Co_{1-y-z}Cu_yZn_z)O.bFe_2O_3,$$

the values of a, b, and x in the formula being shown in Table 3. Each mixture was further mixed with water using a ball mill, was dried, and was then fired at 900° C. to 1,150° C. in an air atmosphere.

TABLE 3

| | Composition Formula (1-a-b)$(Ba_{1-x}SR_x)O \cdot a(Co_{1-y-z}Cu_yZn_z)$ $O \cdot bFe_2O_3$ | | | | | | Firing Temp. | Relative X-ray Density | Permeability | $\Delta\mu''/$ |
|---|---|---|---|---|---|---|---|---|---|---|
| samples | a | b | x | y | z | b/a | (° C.) | (%) | ($\mu'$) | ($\mu'' \cdot \Delta f$) |
| *3-1 | 0.190 | 0.610 | 0.90 | 0.25 | 0.25 | 3.2 | 1100 | 90 | 4.1 | 3.5 |
| *3-2 | 0.200 | 0.600 | 0.25 | 0.25 | 0.25 | 3 | 1075 | 90 | 4.3 | 3.2 |
| *3-3 | 0.200 | 0.540 | 0.50 | 0.25 | 0.25 | 2.7 | 1000 | 90 | 2.4 | 1.9 |
| *3-4 | 0.280 | 0.520 | 0.00 | 0.25 | 0.25 | 1.9 | 1000 | 91 | 2.5 | 1.5 |
| *3-5 | 0.205 | 0.595 | 0.00 | 0.10 | 0.10 | 2.9 | 1100 | 90 | 3.0 | 3.3 |
| 3-6 | 0.205 | 0.595 | 0.10 | 0.25 | 0.25 | 2.9 | 1000 | 91 | 4.2 | 3.2 |
| 3-7 | 0.205 | 0.595 | 0.25 | 0.25 | 0.25 | 2.9 | 1000 | 91 | 4.1 | 3.1 |
| 3-8 | 0.205 | 0.595 | 0.25 | 0.50 | 0.25 | 2.9 | 975 | 92 | 4.0 | 3.0 |
| *3-9 | 0.205 | 0.595 | 0.25 | 0.05 | 0.80 | 2.9 | 1150 | 90 | 10.1 | 1.2 |
| 3-10 | 0.205 | 0.595 | 0.90 | 0.25 | 0.25 | 2.9 | 975 | 91 | 4.0 | 3.2 |
| 3-11 | 0.205 | 0.595 | 1.00 | 0.25 | 0.25 | 2.9 | 975 | 90 | 4.1 | 3.3 |
| 3-12 | 0.220 | 0.560 | 0.50 | 0.25 | 0.25 | 2.55 | 1000 | 90 | 3.9 | 3.4 |
| 3-13 | 0.230 | 0.570 | 0.00 | 0.25 | 0.25 | 2.48 | 1000 | 91 | 4.0 | 3.3 |
| 3-14 | 0.230 | 0.570 | 0.25 | 0.25 | 0.25 | 2.48 | 1000 | 90 | 4.2 | 3.2 |
| 3-15 | 0.230 | 0.570 | 1.00 | 0.25 | 0.25 | 2.48 | 975 | 93 | 4.1 | 3.1 |
| *3-16 | 0.250 | 0.550 | 0.00 | 0.10 | 0.10 | 2.2 | 1100 | 90 | 3.1 | 3 |
| *3-17 | 0.250 | 0.550 | 0.00 | 0.05 | 0.80 | 2.2 | 1150 | 90 | 10.0 | 1.2 |
| 3-18 | 0.250 | 0.550 | 0.00 | 0.25 | 0.25 | 2.2 | 1000 | 92 | 4.0 | 3.2 |
| 3-19 | 0.250 | 0.550 | 0.00 | 0.50 | 0.25 | 2.2 | 980 | 93 | 4.2 | 3.1 |
| *3-20 | 0.250 | 0.550 | 0.00 | 0.50 | 0.30 | 2.2 | 980 | 94 | 4.7 | 1.4 |
| 3-21 | 0.250 | 0.550 | 0.25 | 0.25 | 0.50 | 2.2 | 980 | 94 | 7.9 | 3.6 |
| 3-22 | 0.250 | 0.550 | 0.25 | 0.25 | 0.25 | 2.2 | 980 | 90 | 4.1 | 3.5 |
| 3-23 | 0.250 | 0.550 | 1.00 | 0.50 | 0.25 | 2.2 | 950 | 91 | 4.0 | 3.7 |
| *3-24 | 0.250 | 0.550 | 1.00 | 0.50 | 0.30 | 2.2 | 950 | 93 | 4.6 | 0.9 |
| 3-25 | 0.250 | 0.595 | 0.25 | 0.25 | 0.25 | 2.38 | 980 | 90 | 4.0 | 3.6 |
| 3-26 | 0.250 | 0.595 | 0.50 | 0.25 | 0.25 | 2.38 | 980 | 90 | 4.1 | 3.7 |
| 3-27 | 0.250 | 0.595 | 1.00 | 0.25 | 0.25 | 2.38 | 980 | 91 | 4.0 | 3.8 |
| *3-28 | 0.260 | 0.600 | 0.00 | 0.25 | 0.25 | 2.3 | 980 | 92 | 2.5 | 2 |
| *3-29 | 0.280 | 0.520 | 0.25 | 0.25 | 0.25 | 1.9 | 975 | 93 | 2.7 | 2.1 |

Each fired mixture was wet-ground with a ball mill to prepare a fired powder having a specific surface area of 5 $m^2/g$ or more. Each fired powder was mixed with an acetic vinyl binder and was then dried to form a press molding powder. Each press molding powder was molded into a toroidal core. Each toroidal core was then fired in air at a temperature shown in Table 3. Each fired toroidal core was used as a sample.

The permeability (the real part $\mu'$) at a frequency of 1 GHz was measured with an impedance analyzer using the above samples.

The relative X-ray density was calculated on the basis of the density measured by the Archimedean method and the theoretical density determined by the X-ray method.

In order to suppress EMI at a frequency of several hundred MHz to several GHz, the imaginary part $\mu''$ of the permeability, which increases significantly in this band, is an important factor. Thus, in order to evaluate the samples in this embodiment, the rate of increase of the imaginary part $\mu''$ per 1 GHz was used. The rate is expressed by the formula:

$$\Delta\mu''/(\mu''\cdot\Delta f)=(\mu''_b-\mu''_a)/\{\mu''_a\cdot(f_b-f_a)\}$$

wherein $\mu''_a$ represents the value of $\mu''$ at a frequency of $f_a$ GHz, $\mu''_b$ represents the value of $\mu''$ at a frequency of $f_b$ GHz, and $f_a$ and $f_b$ each represent a frequency in a band of several hundred MHz to several GHz.

Table 3 shows the relative X-ray density, the permeability (the imaginary part $\mu'$) and the increasing rate of $\mu''$ ($\Delta\mu''/(\mu''\cdot\Delta f)$). Since each of the samples have different increasing rates of $\mu''$ at a frequency of several hundred MHz to several GHz, the largest value of each sample is shown in Table 3. In Table 3, sample numbers marked with an asterisk are comparative examples and outside the scope of the present invention.

As shown in Table 3, Samples 3-6 to 2-8, 3-10 to 3-15, 3-18 to 3-19, 3-21 to 3-23, and 3-25 to 2-27 are the examples of the present invention and are expressed by the composition formula (1-a-b)$(Ba_{1-x}Sr_x)O.a(Co_{1-y-z}Cu_yMa_z)O.bFe_2O_3$, and the following conditions are satisfied: $0.205\leqq a\leqq 0.25$, $0.55\leqq b\leqq 0.595$, $0\leqq x\leqq 1$, $0.25\leqq y\leqq 0.75$, $0\leqq z\leqq 0.75$, $0.25\leqq y+z\leqq 0.75$ and $2.2\leqq b/a<3$. Therefore, sintered bodies formed at 1,000° C. or less can be obtained. Furthermore, the sintered bodies have a relative X-ray density of 90% or more, a permeability of 2 or more, and an increasing rate of $\mu''$ of 3 or more.

When the content of Zn substituting for Co increases, the resonant frequency of the rotation magnetization shifts to a low frequency region and the frequency at which the imaginary part $\mu''$ significantly increases shifts to a low frequency region. If the content of Zn (the value of z in the composition formula) in a magnetic material of the present invention is adjusted according to the frequency band of EMI to be suppressed, monolithic impedance elements having a high efficiency for suppressing EMI can be obtained.

In contrast, the following conditions are not satisfied in Samples 3-1 to 3-5, 3-9, 3-16 to 3-17, 3-20, 3-24 and 3-28 to 2-29: $0.205\leqq a\leqq 0.25$, $0.55\leqq b\leqq 0.594$, $0\leqq x\leqq 1$, $0.25\leqq y\leqq 0.75$, $0\leqq z\leqq 0.75$, $0.25\leqq y+z\leqq 0.75$ and $2.2\leqq b/a<3$. There is a problem in that sintered bodies cannot be obtained when the firing temperature is under 1,000° C. and sintered bodies formed at 1,000° C. or less have an increasing rate of $\mu''$ of less than 3.

EXAMPLE 4

Barium carbonate ($BaCO_3$), strontium carbonate ($SrCO_3$), cobalt oxide ($Co_3O_4$), iron oxide (Fe2O3) and copper oxide (CuO) were provided as raw materials. The raw materials were weighed and mixed so as to form a magnetic material expressed by the composition formula $$(1\text{-a-b})(Ba_{1-x}Sr_x)O.a(Co_{1-y}Cu_y)O.bFe_2O_3,$$

the values of a, b, and x in the formula being shown in Table 4-1 and Table 4-2. Each mixture was further mixed with water using a ball mill, was dried, and was then fired at 1,000° C. to 1,200° C. in an air atmosphere.

$0 \leqq x \leqq 1$, $0.25 \leqq y \leqq 0.75$ and $2.2 \leqq b/a < 3$. The above samples further contain about 1 to 30% by weight of $Bi_2O_3$. Therefore, the sintered bodies have a high $Q_m$ value of 40 or more and a relative X-ray density of 90% or more.

In contrast, the content of $Bi_2O_3$ is more than 30% by weight in Samples 4-3, 4-5, 4-7, 4-10, 4-12, and 4-14, which are the comparative examples. These Samples have a large $Q_m$ value of 100 but a small permeability of 1.0, which is substantially the same as that of a nonmagnetic body.

TABLE 4-1

| | Composition Formula $(1\text{-a-b})(Ba_{1-x}Sr_x)O.a(Co_{1-y-z}Cu_yZn_z)O.bFe_2O_3$ | | | | | | | Firing | Relative X- | | |
|---|---|---|---|---|---|---|---|---|---|---|---|
| Samples | a | b | X | y | z | b/a | $Bi_2O_3$ (wt %) | Temp. (° C.) | ray Density (%) | Permeability ($\mu'$) | Qm ($\mu'/\mu''$) |
| 4-1 | 0.205 | 0.595 | 0 | 0 | 0 | 2.9 | 15 | 1000 | 95 | 2.3 | 40 |
| 4-2 | 0.205 | 0.595 | 0 | 0 | 0 | 2.9 | 30 | 1000 | 97 | 2.2 | 45 |
| *4-3 | 0.205 | 0.595 | 0 | 0 | 0 | 2.9 | 35 | 980 | 95 | 1.7 | 60 |
| 4-4 | 0.205 | 0.595 | 0 | 0.25 | 0 | 2.9 | 15 | 980 | 96 | 2.4 | 45 |
| *4-5 | 0.205 | 0.595 | 0 | 0.25 | 0 | 2.9 | 35 | 975 | 98 | 1.8 | 55 |
| 4-6 | 0.205 | 0.595 | 1.0 | 0.25 | 0 | 2.9 | 15 | 940 | 95 | 2.3 | 45 |
| *4-7 | 0.205 | 0.595 | 1.0 | 0.25 | 0 | 2.9 | 35 | 910 | 100 | 1.8 | 100 |
| 4-8 | 0.250 | 0.550 | 0 | 0 | 0 | 2.2 | 15 | 980 | 96 | 2.3 | 50 |
| 4-9 | 0.250 | 0.550 | 0 | 0 | 0 | 2.2 | 30 | 980 | 97 | 2.2 | 55 |
| *4-10 | 0.250 | 0.550 | 0 | 0 | 0 | 2.2 | 35 | 975 | 98 | 1.7 | 100 |
| 4-11 | 0.250 | 0.550 | 0 | 0.25 | 0 | 2.2 | 15 | 960 | 95 | 2.3 | 45 |
| *4-12 | 0.250 | 0.550 | 0 | 0.25 | 0 | 2.2 | 35 | 920 | 100 | 1.8 | 100 |
| 4-13 | 0.250 | 0.550 | 1.0 | 0.25 | 0 | 2.2 | 15 | 940 | 96 | 2.2 | 45 |
| *4-14 | 0.250 | 0.550 | 1.0 | 0.25 | 0 | 2.2 | 35 | 910 | 100 | 1.6 | 100 |

TABLE 4-2

| | Composition Formula $(1\text{-a-b})(Ba_{1-x}Sr_x)O.a(Co_{1-y-z}Cu_yZn_z)O.bFe_2O_3$ | | | | | | | | Relative | | |
|---|---|---|---|---|---|---|---|---|---|---|---|
| Samples | a | b | x | Y | z | b/a | $Bi_2O_3$ (wt %) | Firing Temp. (° C.) | X-ray Density (%) | Permeability ($\mu'$) | $\Delta\mu''/(\mu''\cdot\Delta f)$ |
| 4-15 | 0.250 | 0.550 | 0.2 | 0.5 | 0.3 | 2.2 | 0.1 | 970 | 96 | 3.1 | 3.1 |
| 4-16 | 0.250 | 0.550 | 0.2 | 0.5 | 0.3 | 2.2 | 15 | 930 | 96 | 3 | 3.2 |
| 4-17 | 0.250 | 0.550 | 0.2 | 0.5 | 0.3 | 2.2 | 30 | 920 | 97 | 2.5 | 3.0 |
| *4-18 | 0.250 | 0.550 | 0.2 | 0.5 | 0.3 | 2.2 | 35 | 900 | 100 | 1 | 2.5 |

Bismuth oxide ($Bi_2O_3$) was added to each fired mixture in the amount shown in Tables 4.1 and 4.2, and the resulting mixture was wet-ground with a ball mill to prepare a fired powder having a specific surface area of 5 $m^2$/g or more. Each fired powder was mixed with an acetic vinyl binder and was then dried to form a press molding powder. Each press molding powder was molded into a toroidal core. Each toroidal core was then fired in air at a temperature shown in Tables 4. Each fired toroidal core was used as a sample. In Table 4, sample numbers marked with an asterisk are comparative examples and outside the scope of the present invention.

Table 4-1 shows the relative X-ray density, the real part $\mu'$ of the permeability and the $Q_m$ value ($\mu'/\mu''$). The real part $\mu'$ of the permeability and the imaginary part $\mu''$ were measured with an impedance analyzer at a frequency of 1 GHz using the toroidal core samples. Table 4-2 also shows the relative X-ray density, the real part $\mu'$ of the permeability and $\Delta\mu''/(\mu''\cdot\Delta f)$ at a frequency of 1 GHz.

As shown in Table 4-1, Samples 4-1 to 4-2, 4-4, 4-6, 4-8 to 4-9, 4-11 and 4-13 are examples of the present invention and are expressed by the composition formula $(1\text{-a-b})(Ba_{1-x}Sr_x)O.a(Co_{1-y-z}Cu_yMa_z)O.bFe_2O_3$ in which the following conditions are satisfied: $0.205 \leqq a \leqq 0.25$, $0.55 \leqq b \leqq 0.595$, Accordingly, the content of $Bi_2O_3$ is preferably about 0.1 to 30% by weight.

As shown in Table 4-2, the samples of the example are a hexagonal ferrite and are expressed by the composition formula $$(1\text{-a-b})(Ba_{1-x}Sr_x)O.a(Co_{1-y-z}Cu_yMa_z)O.bFe_2O_3,$$

wherein $0.205 \leqq a \leqq 0.25$, $0.55 \leqq b \leqq 0.595$, $0 \leqq x \leqq 1$, $0.25 \leqq y \leqq 0.75$, $0 < z \leqq 0.75$, $0.25 \leqq y+z \leqq 0.75$ and $2.2 \leqq b/a < 3$. When the above samples further contain about 0.1 to 30% by weight of $Bi_2O_3$, the sintered bodies fired at 1,000° C. or less have a permeability of 2 or more, a value of $\Delta\mu''/(\mu''\cdot\Delta f)$ of 3 or more and a relative X-ray density of 95% or more.

In contrast, Sample 4-18, which is a comparative example and contains more than about 30% by weight of $Bi_2O_3$, has a permeability of 1.0 at a frequency of 1 GHz and a value of $\Delta\mu''/(\mu''\cdot\Delta f)$ of less than 3. Thus, the content of $Bi_2O_3$ is preferably about 0.1 to 30% by weight.

It is clear that the magnetic materials of the example contain a Y or M type hexagonal ferrite as a main phase according to the X-ray diffraction analysis.

EXAMPLES 5 TO 7

In these Examples, monolithic inductance elements and monolithic impedance elements were prepared using high frequency magnetic materials of the present invention.

In Example 5, a high frequency magnetic material comprising a hexagonal ferrite expressed by the composition formula $0.20(Ba_{0.75}Sr_{0.25})O.0.25(Co_{0.50}Cu_{0.50})O.0.55Fe_2O_3$ was used. In Example 6, a high frequency magnetic material comprising a hexagonal ferrite expressed by the composition formula $0.20(Ba_{0.75}Sr_{0.25})O.0.25(CO_{0.50}Cu_{0.50})O.0.55Fe_2O_3$ and 10% by weight of $Bi_2O_3$ was used. In Example 7, a high frequency magnetic material comprising a hexagonal ferrite expressed by the composition formula $0.20(Ba_{0.8}Sr_{0.2})O.0.21(Co_{0.75-z}Cu_{0.25}Zn_z)O.0.59Fe_2O_3$, wherein $0 \leqq z \leqq 0.30$, was used.

Barium carbonate ($BaCO_3$), strontium carbonate ($SrCO_3$), cobalt oxide ($Co_3O_4$), iron oxide ($Fe_2O_3$), copper oxide (CuO), zinc oxide (ZnO) and bismuth oxide ($Bi_2O_3$) were provided as raw materials.

The above raw materials were compounded so as to form the high frequency magnetic materials of Examples 5 to 7. Each compounded raw material powders was fired. A polyvinyl binder and an organic solvent were added to each fired powder, and each mixture was kneaded to prepare a slurry material. Green sheets were prepared by a doctor blade method using the slurry material.

An Ag internal electrode pattern was formed on each green sheet by printing such that coils in a layered structure can be obtained. The plurality of green sheets each having the internal electrode pattern were stacked such that the green sheets can be electrically connected with through-holes. The stacked body was sandwiched between other green sheets having no electrode pattern and functioning as outer layers, and the sandwiched body was then pressed to form a green compact. The green compact was fired at 925° C. to form a sintered compact having internal Ag electrodes. The sintered compact was barrel-polished to expose the internal electrodes at both ends. External Ag electrodes were provided at both ends by a baking method.

A monolithic element functioning as an inductance element or an impedance element shown in FIG. 1 was then completed. As shown in FIG. 1, a magnetic body 1 includes through-holes 2, coil internal electrodes 3 and external electrodes 4. The coil internal electrodes 3 are electrically connected by the through-holes 2.

The monolithic element formed by the low temperature firing has a relative X-ray density of 90% or more. The monolithic element also has high mechanical strength, large permeability and a large value of the product $\mu Q$. Furthermore, the following problems do not arise: diffusion of Ag and destruction of the coil internal electrodes 3.

In Example 7, monolithic impedance elements having different Zn contents were prepared. For the obtained monolithic impedance elements, the impedance Z, the reactance X, and resistance R were measured at frequencies of 1 MHz and 1 GHz. The obtained values are shown in Table 5.

TABLE 5

Composition Formula: $0.20(Ba_{0.8}Sr_{0.2}O \cdot 0.21(Co_{0.75}\text{-}zCu_{0.25}Zn_z)O \cdot 0.59Fe_2O_3$

| | | Impedance | | Reactance | | Resistance | |
|---|---|---|---|---|---|---|---|
| Samples | z | 1 MHz (Ω) | 1 GHz (Ω) | 1 MHz (Ω) | 1 GHz (Ω) | 1 MHz (Ω) | 1 GHz (Ω) |
| 7-1 | 0.00 | 0.2 | 364 | 0.2 | 361 | 0.04 | 45 |
| 7-2 | 0.05 | 0.2 | 542 | 0.2 | 528 | 0.03 | 150 |

TABLE 5-continued

Composition Formula: $0.20(Ba_{0.8}Sr_{0.2}O \cdot 0.21(Co_{0.75}\text{-}zCu_{0.25}Zn_z)O \cdot 0.59Fe_2O_3$

| | | Impedance | | Reactance | | Resistance | |
|---|---|---|---|---|---|---|---|
| Samples | z | 1 MHz (Ω) | 1 GHz (Ω) | 1 MHz (Ω) | 1 GHz (Ω) | 1 MHz (Ω) | 1 GHz (Ω) |
| 7-3 | 0.10 | 0.1 | 771 | 0.1 | 717 | 0.03 | 284 |
| 7-4 | 0.30 | 0.4 | 1119 | 0.4 | −100 | 0.04 | 1114 |

According to the present invention, a sintered body formed at 1,000° C. or less can be obtained, wherein the sintered body includes a Y or M type hexagonal ferrite as a main phase and has a relative X-ray density of 90% or more. Thus, high frequency circuit components such as monolithic inductance elements and monolithic impedance elements including each electrode layer disposed between magnetic layers can be obtained by firing green compacts including magnetic layers and Ag or Ag—Pd electrode layers. Therefore, the magnetic material of the present invention is suitable for monolithic inductance elements and monolithic impedance elements.

In the high frequency magnetic material of the present invention, the increasing rate of $\mu''$, which is expressed by the formula $\Delta\mu''/(\mu''\cdot\Delta f)$, is 3 or more at a frequency of several hundred MHz to several GHz. Thus, when an impedance element is prepared using the magnetic material, the impedance element has a high resistance R, that is, the impedance element can efficiently convert noise in the above band into heat.

Furthermore, a ferrox planar hexagonal ferrite sintered body having a high sintered density and a high $Q_m$ value at a frequency of several GHz can be obtained. Such a sintered body is suitable for impedance elements and inductance elements used at a frequency of several hundred MHz to several GHz. An inductance element including the sintered body has a large inductance if the number of windings is small. Therefore, the miniaturization of such an element can be achieved. Since the electrical resistance is decreased by reducing the number of windings, the inductance element further has a large gain of the Q value (X/R). On the other hand, the impedance element has a sufficiently small value of the imaginary part of the permeability, suppresses EMI at a frequency of less than several GHz, and maintains a required impedance at a frequency of several GHz or more.

What is claimed is:

1. A high frequency magnetic material comprising a Y or M type hexagonal ferrite expressed by the composition formula $$(1\text{-}a\text{-}b)(Ba_{1-x}Sr_x)O.aMeO.bFe_2O_3$$

where Me is Co and Cu, $0.205 \leqq a \leqq 0.25$, $0.55 \leqq b \leqq 0.595$, $0 \leqq x \leqq 1$ and $2.2 \leqq b/a \leqq 3$.

2. A high frequency circuit element comprising a sintered compact comprising magnetic layers and internal electrode layers, wherein the magnetic layers comprise the high frequency magnetic material according to claim 1.

3. A high frequency magnetic material comprising a Y or M type hexagonal ferrite expressed by the composition formula $$(1\text{-}a\text{-}b)(Ba_{1-x}Sr_x)O.aMeO.bFe_2O_3$$

where Me is at least one member selected from the group consisting of Co, Ni, Cu, Mg, Mn and Zn, and also Mg when Me is a combination of Co and Cu, $0.205 \leqq a \leqq 0.25$, $0.55 \leqq b \leqq 0.595$, $0 \leqq x \leqq 1$ and $2.2 \leqq b/a \leqq 3$, and further comprising about 0.1 to 30% by weight of $Bi_2O_3$.

4. A high frequency circuit element comprising a sintered compact comprising magnetic layers and internal electrode layers, wherein the magnetic layers comprise the high frequency magnetic material according to claim 3.

5. A high frequency magnetic material according to claim 1, wherein Me is $(Co_{1-y}Cu_y)$ in which $0.25 \leqq y \leqq 0.75$, whereby said Y or M type hexagonal ferrite is expressed by the composition formula $$(1\text{-}a\text{-}b)(Ba_{1-x}Sr_x)O.aMeO.bFe_2O_3.$$

6. A high frequency circuit element comprising a sintered compact comprising magnetic layers and internal electrode layers, wherein the magnetic layers comprise the high frequency magnetic material according to claim 5.

7. The high frequency magnetic material according to claim 5, further comprising about 0.1 to 30% by weight of $Bi_2O_3$.

8. A high frequency circuit element comprising a sintered compact comprising magnetic layers and internal electrode layers, wherein the magnetic layers comprise the high frequency magnetic material according to claim 7.

9. A high frequency magnetic material according to claim 1, wherein Me is $(Co_{1-y-z}Cu_yMa_z)$ in which Ma is at least one member selected from the group consisting of Ni, Mg and Zn $025 \leqq y \leqq 0.75$, $0 \leqq z \leqq 0.75$, $0.25 \leqq y+z \leqq 0.75$, whereby the Y or M type hexagonal ferrite is expressed by the composition formula $$(1\text{-}a\text{-}b)(Ba_{1-x}Sr_x)O.a(Co_{1-y-z}Cu_yMa_z)O.bFe_2O_3.$$

10. A high frequency circuit element comprising a sintered compact comprising magnetic layers and internal electrode layers, wherein the magnetic layers comprise the high frequency magnetic material according to claim 9.

11. The high frequency magnetic material according to claim 9, further comprising about 0.1 to 30% by weight of $Bi_2O_3$.

12. A high frequency magnetic material according to claim 9, wherein Ma is Zn, whereby the Y or M type hexagonal ferrite is expressed by the composition formula $$(1\text{-}a\text{-}b)(Ba_{1-x}Sr_x)O.a(Co_{1-y-z}Cu_yZn_z)O.bFe_2O_3.$$

13. A high frequency circuit element comprising a sintered compact comprising magnetic layers and internal electrode layers, wherein the magnetic layers comprise the high frequency magnetic material according to claim 12.

14. The high frequency magnetic material according to claim 13, further comprising about 0.1 to 30% by weight of $Bi_2O_3$.

15. A high frequency circuit element comprising a sintered compact comprising magnetic layers and internal electrode layers, wherein the magnetic layers comprise the high frequency magnetic material according to claim 14.

16. A high frequency magnetic material according to claim 1, wherein the peak intensity of $(Co,Cu)_2Y$(205) plane/peak intensity of {BaM(114) plane+BF(212) plane+spinel(220) plane+CuO(111) plane+$(Co,Cu)_2Y$(205) plane} is at least 60%.

17. A high frequency magnetic material according to claim 1, wherein where Me is further at least one member selected from the group consisting of Ni, Mg, Mn, and Zn.

18. A high frequency circuit element comprising a sintered compact comprising magnetic layers and internal electrode layers, wherein the magnetic layers comprise the high frequency magnetic material according to claim 17.

* * * * *